US012565601B2

(12) United States Patent
Watanabe et al.

(10) Patent No.: US 12,565,601 B2
(45) Date of Patent: Mar. 3, 2026

(54) BONDED OBJECT, AND METHOD FOR MANUFACTURING BONDED OBJECT

(71) Applicants: VALQUA, LTD., Tokyo (JP); National Institute of Advanced Industrial Science and Technology, Tokyo (JP)

(72) Inventors: Naoki Watanabe, Machida (JP); Yoshihiro Setoguchi, Machida (JP); Takafumi Aizawa, Sendai (JP)

(73) Assignees: VALQUA, LTD., Tokyo (JP); National Institute of Advanced Industrial Science and Technology, Tokyo (JP)

( * ) Notice: Subject to any disclaimer, the term of this patent is extended or adjusted under 35 U.S.C. 154(b) by 264 days.

(21) Appl. No.: 18/283,265

(22) PCT Filed: Mar. 25, 2022

(86) PCT No.: PCT/JP2022/014626

§ 371 (c)(1),
(2) Date: Sep. 21, 2023

(87) PCT Pub. No.: WO2022/210413

PCT Pub. Date: Oct. 6, 2022

(65) Prior Publication Data

US 2024/0166918 A1 May 23, 2024

(30) Foreign Application Priority Data

| Mar. 31, 2021 | (JP) | ................................. | 2021-060966 |
| Mar. 31, 2021 | (JP) | ................................. | 2021-060967 |
| Aug. 18, 2021 | (JP) | ................................. | 2021-133518 |

(51) Int. Cl.
*C09J 7/10* (2018.01)
*B32B 5/02* (2006.01)
(Continued)

(52) U.S. Cl.
CPC ................. *C09J 7/10* (2018.01); *B32B 5/022* (2013.01); *B32B 5/267* (2021.05); *B32B 7/12* (2013.01);
(Continued)

(58) Field of Classification Search
CPC ............ C09J 2427/008; C09J 2400/266; C09J 2301/414; C09J 2301/202; C09J 2203/358;
(Continued)

(56) References Cited

U.S. PATENT DOCUMENTS

| 2013/0109790 A1* | 5/2013 | Fukushi | ................. C09J 127/12 524/148 |
| 2022/0282412 A1 | 9/2022 | Kato et al. | |

FOREIGN PATENT DOCUMENTS

| JP | S5959909 A | 4/1984 |
| JP | H01108246 A | 4/1989 |
| | (Continued) | |

OTHER PUBLICATIONS

Machine translation of JP 01-108246 A (Year: 1989).*
Machine translation of JP 2018-099885 A (Year: 2018).*

*Primary Examiner* — Vishal I Patel
(74) *Attorney, Agent, or Firm* — The Webb Law Firm

(57) ABSTRACT

An embodiment of the present invention relates to a bonded object or a method for manufacturing a bonded object, the bonded object having bases bonded therein while placing an adhesive layer in between, the adhesive layer being obtained from a fluororubber composition that contains at least one fluororubber selected from fluoroelastomer (FKM) and perfluoroelastomer (FFKM), and has a Mooney viscosity (ML 1+10) at 121° C., measured in accordance with ASTM D1646, of 80 to 115.

10 Claims, 1 Drawing Sheet

(51) Int. Cl.

| | |
|---|---|
| *B32B 5/26* | (2006.01) |
| *B32B 7/12* | (2006.01) |
| *B32B 37/12* | (2006.01) |
| *B32B 37/18* | (2006.01) |
| *C08F 214/22* | (2006.01) |
| *C08F 214/26* | (2006.01) |
| *C08F 214/28* | (2006.01) |
| *C09J 5/00* | (2006.01) |
| *C09J 7/30* | (2018.01) |
| *C09J 127/14* | (2006.01) |
| *C09J 127/18* | (2006.01) |
| *C09J 127/20* | (2006.01) |

(52) U.S. Cl.
 CPC .............. *B32B 37/12* (2013.01); *B32B 37/18* (2013.01); *C08F 214/22* (2013.01); *C08F 214/26* (2013.01); *C08F 214/28* (2013.01); *C09J 5/00* (2013.01); *C09J 7/30* (2018.01); *C09J 127/14* (2013.01); *C09J 127/18* (2013.01); *C09J 127/20* (2013.01); *B32B 2250/03* (2013.01); *B32B 2250/20* (2013.01); *B32B 2262/0253* (2013.01); *B32B 2305/18* (2013.01); *B32B 2307/748* (2013.01); *B32B 2309/12* (2013.01); *B32B 2309/66* (2013.01); *C09J 2203/358* (2020.08); *C09J 2301/202* (2020.08); *C09J 2301/414* (2020.08); *C09J 2400/266* (2013.01); *C09J 2427/008* (2013.01)

(58) Field of Classification Search
 CPC ...... C09J 127/20; C09J 127/18; C09J 127/14; C09J 5/00; C09J 7/30; C09J 7/10; B32B 2309/66; B32B 2309/12; B32B 2307/748; B32B 2305/18; B32B 2262/0253; B32B 2250/20; B32B 2250/03; B32B 37/18; B32B 37/12; B32B 5/022; B32B 5/267; C08F 214/28; C08F 214/26; C08F 214/22
 See application file for complete search history.

(56) References Cited

FOREIGN PATENT DOCUMENTS

| | | | | |
|---|---|---|---|---|
| JP | 2002283517 A | 10/2002 | | |
| JP | 2018099885 A | 6/2018 | | |
| WO | WO-2021009092 A1 * | 1/2021 | ............. | C08L 77/06 |
| WO | 2021020147 A1 | 2/2021 | | |

* cited by examiner

[Fig. 1]
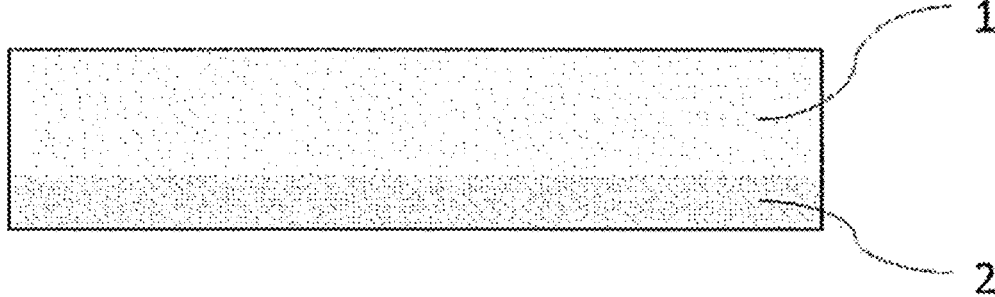
[Fig. 2]
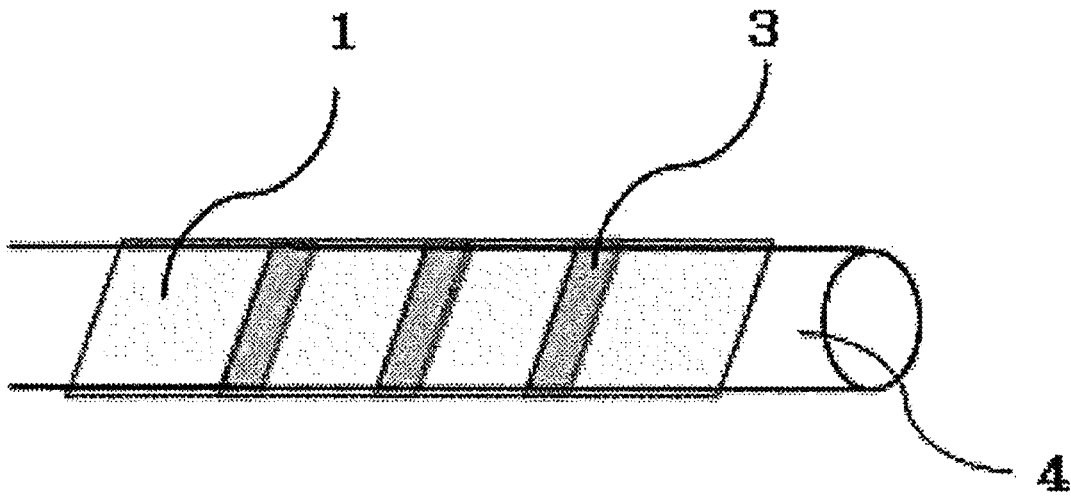

BONDED OBJECT, AND METHOD FOR MANUFACTURING BONDED OBJECT

CROSS-REFERENCE TO RELATED APPLICATIONS

This application is the United States national phase of International Application No. PCT/JP2022/014626 filed Mar. 25, 2022, and claims priority to Japanese Patent Application Nos. 2021-060966 filed Mar. 31, 2021, 2021-060967 filed Mar. 31, 2021, and 2021-133518 filed Aug. 18, 2021, the disclosures of which are hereby incorporated by reference in their entireties.

BACKGROUND OF THE INVENTION

Field of the Invention

An embodiment of the present invention relates to a bonded object, or a method for manufacturing a bonded object.

Description of Related Art

A base such as nonwoven fabric, woven fabric, fiber, porous membrane, or film may be used alone, or may be used while laminated with a plurality of the same bases or other bases.

When used in a thus laminated form, the bases have been usually bonded by a method in which an adhesive is used for bonding the bases by allowing a component contained in the adhesive to react, or by allowing a solvent to vaporize; or by thermally fusing an adhesive layer or the bases per se under melting (e.g., see Patent Literature 1: JP 2002-283517 A).

SUMMARY OF THE INVENTION

Technical Problem

The method of bonding the bases with the adhesive, although having an advantage of easy bonding of the bases, would occasionally result in poor heat resistance of the adhesive part in the obtainable bonded object, or foreign matter inclusion or contamination through the adhesive part, leaving room for improvement in this respect.

On the other hand, the method of bonding the bases by thermal fusion, although having an advantage of achieving large bond strength, would however restrict the freedom of choice of the bases in terms of heat resistance. The thermal fusion is also anticipated to degrade (lose), for example, the shape or property inherent to the base before fused, which is more specifically exemplified by the shape of void, for example, of the base before fusion, a function of a functional material contained in the base before fusion, and a function given by some treatment such as surface treatment inherent to the base before fusion. The method of bonding the bases by thermal fusion has left room for improvement, from the viewpoint of these.

The method of bonding the bases by thermal fusion has left room for improvement, also from the viewpoint of energy cost.

An embodiment of the present invention is therefore to provide a bonded object having bases bonded therein tightly enough with use of a fluororubber, without damaging, for example, the physical property, shape, and function inherent to the bases before bonded.

Solution to Problem

After thorough investigations aimed at solving the problems, the present inventors found that configuration examples below can solve the problems, and arrived at the present invention.

The configuration examples of the present invention are as follows.

[1] A bonded object having bases bonded therein while placing an adhesive layer in between, the adhesive layer being obtained from a fluororubber composition that contains at least one fluororubber selected from fluoroelastomer (FKM) and perfluoroelastomer (FFKM), and has a Mooney viscosity (ML 1+10) at 121° C., measured in accordance with ASTM D1646, of 80 to 115.

[2] The bonded object according to [1], wherein the fluororubber composition contains:

a fluororubber (A1) having a Mooney viscosity (ML 1+10) at 121° C., measured in accordance with ASTM D1646, of 40 to 150; and a fluororubber (A2) having a Mooney viscosity (ML 1+10) at 121° C., measured in accordance with ASTM D1646, of 10 or larger and smaller than 40.

[3] The bonded object according to [1] or [2], wherein the fluororubber contains a vinylidene fluoride-hexafluoropropylene-tetrafluoroethylene-based polymer.

[4] The bonded object according to any one of [1] to [3], being bonded in the presence of liquid or gaseous carbon dioxide.

[5] The bonded object according to any one of [1] to [4], being bonded at a temperature lower than a temperature at which the fluororubber melts.

[6] A method for manufacturing a bonded object, the method including:

a step of preparing a structure having bases and an adhesive arranged between the bases; and a step of joining the structure in the presence of liquid or gaseous carbon dioxide, the adhesive being obtained from a fluororubber composition having a Mooney viscosity (ML 1+10) at 121° C., measured in accordance with ASTM D1646, of 80 to 115.

[7] The method for manufacturing a bonded object according to [6], further including:

a step of placing the structure in a pressure vessel; and a step of introducing carbon dioxide into the pressure vessel.

[8] The method for manufacturing a bonded object according to [7], wherein, the step of introducing carbon dioxide into the pressure vessel is a step of introducing liquid or gaseous carbon dioxide so as to adjust a pressure in the pressure vessel at 3 MPa or higher.

[9] The method for manufacturing a bonded object according to any one of [6] to [8], wherein the fluororubber composition contains at least one fluororubber selected from fluoroelastomer (FKM) and perfluoroelastomer (FFKM).

[10] The method for manufacturing a bonded object according to any one of [6] to [9], wherein the fluororubber composition contains:

a fluororubber (A1) having a Mooney viscosity (ML 1+10) at 121° C., measured in accordance with ASTM D1646, of 40 to 150; and

a fluororubber (A2) having a Mooney viscosity (ML 1+10) at 121° C., measured in accordance with ASTM D1646, of 10 or larger and smaller than 40.

[11] The method for manufacturing a bonded object according to any one of [6] to [10], wherein the fluororubber composition contains a vinylidene fluoride-hexafluoropropylene-tetrafluoroethylene-based polymer.

[12] The method for manufacturing a bonded object according to any one of [6] to [11], wherein the adhesive is the fluororubber composition in a liquid or paste form; a dried product of the fluororubber composition in a liquid or paste form; or a fiber, nonwoven fabric, or film obtained from the fluororubber composition.

[13] The method for manufacturing a bonded object according to any one of [6] to [12], wherein the adhesive is a fluororubber fiber or fluororubber nonwoven fabric obtained by a method including:

a step A for spinning the fluororubber composition; and a step B for crosslinking a fiber obtained in the step A.

[14] The method for manufacturing a bonded object according to any one of [6] to [13], wherein at least one of the bases is a nonwoven fabric, a woven fabric, a porous membrane, or a fiber.

[15] The method for manufacturing a bonded object according to any one of [6] to [14], wherein the base is a base selected from a nonwoven fabric, a woven fabric, and a porous membrane, and the adhesive is a fiber or nonwoven fabric obtained from the fluororubber composition.

Advantageous Effects of Invention

An embodiment of the present invention can provide a bonded object having bases bonded therein with use of a fluororubber, with a sufficient bond strength (typically 0.3 N/10 mm or larger in terms of peel strength), without degrading for example physical property, shape, and function inherent to the bases before bonded.

According to an embodiment of the present invention featured by its large freedom of choice of bases, a bonded object having desired bases bonded therein is obtainable without degrading for example the physical property, shape, and function inherent to the bases. Moreover, the adhesive moiety (adhesive layer) excels in chemical resistance, making it possible to obtain a bonded object less likely to cause foreign matter inclusion or contamination through the adhesive moiety (adhesive layer).

According to an embodiment of the present invention capable of forming a bonded object without external heating, the bonded object is obtainable at a low energy cost in a simplified process. The thus obtained bonded object also has an advantage of high readiness for secondary processing.

According to an embodiment of the present invention also capable of forming a plurality of bounded objects by a single process, a plurality of desired bonded objects, if necessary, is obtainable at a low energy cost in a simplified process.

4

BRIEF DESCRIPTION OF THE DRAWINGS

FIG. 1 is a plan view schematically illustrating a laminate of a base and an adhesive used in Example 9.

FIG. 2 is a front view schematically illustrating the laminate of FIG. 1, spirally wound around a rod or cylindrical member (a form of a bonded object obtained in Example 9).

DESCRIPTION OF THE INVENTION

<<Bonded Object>>

A bonded object according to an embodiment of the present invention (also referred to as "the present bonded object", hereinafter) has bases bonded therein while placing an adhesive layer in between, the adhesive layer being obtained from a fluororubber composition that contains at least one fluororubber selected from fluoroelastomer (FKM) and perfluoroelastomer (FFKM), and has a Mooney viscosity of 80 to 115.

In this specification, "Mooney viscosity" means a Mooney viscosity (ML 1+10) at 121° C., measured in accordance with ASTM D1646.

The bonded object may be the one different from so-called, press-bonded object, obtainable by bonding the bases without being pressed (also referred to as "bonded object (I)", hereinafter), or may be a so-called, press-bonded object obtainable by bonding the bases by pressing (also referred to as "bonded object (II)", hereinafter).

For example, the bonded object (I) obtainable by the present method (I) described later is bonded usually under a pressure (specific pressure) which amounts only approximately several hundred $gf/cm^2$ applied for the bonding, in the direction of stacking of the bases, which is different from a press-bonded object to which a pressure of approximately 10 $kgf/cm^2$ or larger is usually applied for the bonding, in the direction of stacking of the bases.

The present bonded object is preferably the bonded object (I), from the viewpoint of achieving sufficiently tight bonding of the bases almost without losing the shape inherent to the bases before bonded (for example, void possessed by nonwoven fabric or fiber shape); meanwhile preferably the bonded object (II), from the viewpoint of higher bond strength of the bases.

The present bonded object is preferably the one bonded in the presence of liquid or gaseous carbon dioxide.

In the bonding in the presence of liquid or gaseous carbon dioxide, the carbon dioxide can plasticize at least a part of the fluororubber, whereby the bases are mutually meshed and fixed the shape by, for example, an anchor effect to bond and join with each other. The bonded object is thus obtainable without external heating or pressing of the bases, while maintaining, for example, the shape and property of the bases having been possessed before the bonding. Hence, the bonded object obtained by bonding in the presence of liquid or gaseous carbon dioxide is preferred, since the bases are bonded therein tightly enough, while maintaining for example the shape and physical property inherent to the bases before bonding.

From the same reason, the bonded object (II) is preferably a bonded object obtainable by press-bonding in the presence of liquid or gaseous carbon dioxide, and particularly in the presence of carbon dioxide in the form of liquid, gas-liquid mixture, or near-liquid.

The "carbon dioxide in the form of near-liquid" in this specification specifically refers to carbon dioxide having a density of 0.4 g/mL (approximately half the density of liquid carbon dioxide) or larger.

The present bonded object is preferably the one bonded at a temperature lower than a temperature at which the fluororubber melts, preferably at a temperature of approximately 50° C. or below, and even more preferably without external heating.

In this case, various bases are applicable to the bases for the present bonded object. Even with use of the base functionalized and the like by any of known surface treatment processes such as hydrophilization, the obtainable bonded object can maintain such function without losing it, proving a wide freedom of choice of the bases. In particular, the bonded object is obtainable with the property inherent to the bases (function, void of nonwoven fabric or fiber shape, for example) remained unchanged. Hence, the present bonded object, when designed to contain any of the later-described functional materials, can maintain for example the function or property of such functional material, even if the functional material were poorly heat resistant.

The shape and size of the present bonded object are appropriately selectable depending on, for example, desired applications, without special limitation. Shape of the present bonded object is exemplified by laminate, bag, ring, spiral, and tube (cylinder).

Also the thickness of the present bonded object is appropriately selectable depending on purpose of use without special limitation, wherein a laminate-type bonded object having a nonwoven fabric or a porous membrane used therein as the base, preferably has a thickness of typically 10 μm or larger, and preferably 50 μm or larger, meanwhile usually 30 mm or smaller, and preferably 25 mm or smaller.

The present bonded object is suitably used for applications having employed bases that contain, for example, resin, carbon material, glass or metal; which are particularly suitable for applications in the fields of, for example, medicine, electric equipment, and semiconductor; and are specifically applicable to, for example, filter, various separators, and clothing.

The present bonded object may contain one or more functional materials required for a desired use depending on such desired use. The functional material is specifically exemplified by food, chemical (pharmaceutical, agricultural, and industrial chemicals), colorant, adsorbent, deodorant, fragrance, insect repellent, electronic device material, enzyme, and catalyst.

The present bonded object, designed to contain, for example, chemical, may be designed to have, for example, controlled releasability.

<Adhesive Layer>

The adhesive layer is obtained from the fluororubber composition.

The adhesive layer in the bonded object now refers to a member that joins the bases, and includes not only those in the form of layer (film), but also a layer that resides only among fibers (member that connects fibers).

The thickness of the adhesive layer, although variable typically depending on an adhesive used for manufacturing the bonded object, is usually 1 μm or larger, and preferably 3 μm or larger, meanwhile usually 1 mm or smaller, and preferably 200 μm or smaller.

[Fluororubber Composition]

The fluororubber composition as a raw material for the adhesive layer contains at least one fluororubber selected from fluoroelastomer (FKM) and perfluoroelastomer (FFKM), and has a Mooney viscosity of 80 to 115. The fluororubber composition in the adhesive used in the present method below preferably contains at least one fluororubber selected from fluoroelastomer (FKM) and perfluoroelastomer (FFKM).

The Mooney viscosity of the fluororubber composition is 80 or larger, preferably 85 or larger, and more preferably 90 or larger, meanwhile 115 or smaller, and preferably 110 or smaller.

With the adhesive layer or the adhesive obtained from the fluororubber composition having the Mooney viscosity fallen in the aforementioned ranges, the bonded object having the bases bonded therein tightly enough will be easily obtainable.

In particular, when manufacturing the bonded object in the presence of liquid or gaseous carbon dioxide, the carbon dioxide can plasticize at least a part of the fluororubber as described previously, whereby the bases seem to be mutually meshed and fixed the shape by, for example, an anchor effect to bond and join with each other. Since the fluororubber composition having the Mooney viscosity within the aforementioned ranges is considered to have high affinity with carbon dioxide, and to be more easily plasticized by carbon dioxide, so that use of such composition is considered to enable manufacture of the bonded object having the bases bonded therein tightly enough.

The fluororubber composition having the Mooney viscosity within the aforementioned ranges is easy to spin, less likely to deform after spun into fluororubber fiber (nonwoven fabric), is easy to form fiber (nonwoven fabric) with a desired shape (average fiber diameter). Hence, the fluororubber fiber or the fluororubber nonwoven fabric, when intended for use as the adhesive in the manufacture of the bonded object, may be formed easily.

Note that the fluororubber (fluororubber composition) in an embodiment of the present invention would occasionally be crosslinked. The Mooney viscosity in the context of this specification refers to the Mooney viscosity of the fluororubber (fluororubber composition) before being crosslinked.

[Fluororubber]

The fluororubber is at least one selected from fluoroelastomer (FKM) and perfluoroelastomer (FFKM). Among these, FKM is preferred from the viewpoint of easier plasticization with carbon dioxide. FKM excels in chemical resistance and heat resistance, and also excels in resistance to stain, foul, oxidation, and UV radiation.

One kind, or two or more kinds of the fluororubber may be contained in the fluororubber composition.

The fluororubber used for the fluororubber composition is preferably the one that can control the Mooney viscosity of obtained fluororubber composition within the aforementioned ranges.

The fluororubber used herein may be one or two or more kinds of fluororubbers having the Mooney viscosity within the aforementioned ranges. It is preferred to use a fluororubber (A1) having a Mooney viscosity of 40 to 150 and a fluororubber (A2) having a Mooney viscosity of 10 or larger and smaller than 40, from the viewpoint, for example, that the fluororubber composition having the Mooney viscosity within the aforementioned ranges is easily prepared; that the fluororubber composition is easy to spin, and that, in a case where the fluororubber fiber or the fluororubber nonwoven fabric is used as the adhesive for manufacturing the bonded object, the obtainable fluororubber fiber (nonwoven fabric) is less likely to deform after spun into fluororubber fiber (nonwoven fabric), and is easy to form fiber (nonwoven fabric) with a desired shape (average fiber diameter).

The fluororubber preferably has a weight-average molecular weight, measured by gel permeation chromatography, of preferably $1 \times 10^3$ or larger, more preferably $1 \times 10^4$ or larger, meanwhile preferably $5 \times 10^7$ or smaller, and more preferably $1 \times 10^7$ or smaller from the viewpoint of, for example, high solubility in a solvent when preparing a liquid or paste-like fluororubber composition, and from the viewpoint of easiness of forming the adhesive layer that excels in mechanical strength.

The fluororubber preferably has a fluorine content of 55% by mass or more, which is more preferably 62% by mass of more, and particularly 64% by mass or more, meanwhile preferably 80% by mass or less, and more preferably 78% by mass or less.

When the fluorine content is within the aforementioned ranges, the fluororubber fiber or the fluororubber nonwoven fabric, intended as the adhesive used for manufacturing the bonded object, will be spun easily, and will be easily formed into the adhesive layer that excels in chemical resistance.

The fluorine content may be measured and estimated by, for example, solid nuclear magnetic resonance (NMR) method or mass spectrometry (MS).

Content of the fluororubber in the adhesive layer is preferably 20% by mass or more, more preferably 30% by mass or more, and particularly 50% by mass or more. The upper limit of the content, although not specifically limited, may be 100% by mass, in a case where the adhesive layer does not contain any filler described below.

The content of the fluororubber contained in the fluororubber composition is typically 5% by mass or more, and preferably 10% by mass or more, meanwhile typically 100% by mass or less, preferably 80% by mass of less, and even more preferably 70% by mass or less.

With the content of the fluororubber controlled within the aforementioned ranges, more easily obtainable is the adhesive layer that can demonstrate the properties such as chemical resistance or heat resistance inherent to the fluororubber.

FFKM

FFKM is exemplified by, but not particularly limited to, polymers having no hydrogen atom (carbon-hydrogen bond) in the principal chain thereof (exclusive of the terminal), which are specifically exemplified by a tetrafluoroethylene (TFE)-perfluorovinyl ether-based copolymer, wherein preferred is a copolymer that contains a TFE-derived structural unit, a perfluorovinyl ether-derived structural unit, and an optional structural unit derived from a crosslinkable-moiety-containing monomer.

The perfluorovinyl ether is preferably exemplified by perfluoro(alkyl vinyl ether) and perfluoro(alkoxy alky vinyl ether).

The perfluoro(alkyl vinyl ether) is exemplified by a compound whose alkyl group has, for example, 1 to 10 carbon atoms, which is specifically exemplified by perfluoro(methyl vinyl ether), perfluoro(ethyl vinyl ether), and perfluoro (propyl vinyl ether). Perfluoro(methyl vinyl ether) is preferred.

The perfluoro(alkoxy alkyl vinyl ether) is exemplified by a compound in which the vinyl ether group ($CF_2$=CFO—) has bound thereto a group typically having 3 to 15 carbon atoms, which is specifically exemplified by:
$CF_2$=CFOCF$_2$CF (CF$_3$) OC$_n$F$_{2n+1}$,
$CF_2$=CFO (CF$_2$)$_3$OC$_n$F$_{2n+1}$,
$CF_2$=CFOCF$_2$CF (CF$_3$)O(CF$_2$O)$_m$C$_n$F$_{2n+1}$, and
$CF_2$=CFO (CF$_2$)$_2$OC$_n$F$_{2n+1}$.

In these formulae, each n independently represents 1 to 5 for example, and m represents 1 to 3 for example.

With the structural unit derived from the crosslinkable moiety-containing monomer contained therein, FFKM acquires crosslinkability. The crosslinkable moiety means a moiety where a crosslinking reaction can occur, and is exemplified by nitrile group, halogeno group (iodo group or bromo group, for example), and perfluorophenyl group.

The crosslinkable moiety-containing monomer having a nitrile group as the crosslinkable moiety is exemplified by nitrile group-containing perfluorovinyl ether,
which is specifically exemplified by
$CF_2$=CFO(CF$_2$)$_n$OCF(CF$_3$)CN (n represents 2 to 4, for example),
$CF_2$=CFO(CF$_2$)$_n$CN (n represents 2 to 12, for example),
$CF_2$=CFO[CF$_2$CF(CF$_3$)O]$_m$(CF$_2$)$_n$CN (n represents 1 to 4, for example, and m represents 1 to 5, for example), and
$CF_2$=CFO[CF$_2$CF(CF$_3$)O]$_n$CF$_2$CF (CF$_3$)CN (n represents 0 to 4, for example).

The crosslinkable moiety-containing monomer having halogeno group as the crosslinkable moiety is exemplified by halogeno group-containing perfluorovinyl ether, which is specifically exemplified by compounds derived from the aforementioned nitrile group-containing perfluorovinyl ethers, by replacing the nitrile group with a halogeno group.

In FFKM, the content of the TFE-derived structural unit is preferably 50.0 to 79.9 mol %, the content of the perfluorovinyl ether-derived structural unit is preferably 20.0 to 46.9 mol %, and the content of the structural unit derived from the crosslinkable moiety-containing monomer is preferably 0.1 to 2.0 mol %.

FKM

FKM is exemplified by fluoroelastomer other than the aforementioned FFKM, and is specifically exemplified by, but not particularly limited to vinylidene fluoride-hexafluoropropylene-based polymer; vinylidene fluoride-hexafluoropropylene-tetrafluoroethylene-based polymer; tetrafluoroethylene-propylene-based polymer; vinylidene fluoride-propylene-tetrafluoroethylene-based polymer; ethylene-tetrafluoroethylene-perfluoro(methyl vinyl ether)-based polymer; vinylidene fluoride-tetrafluoroethylene-perfluoro (methyl vinyl ether)-based polymer; and vinylidene fluoride-perfluoro(methyl vinyl ether)-based polymer. Among these, ternary polymers are preferred from the viewpoint of excellence in, for example, heat resistance and chemical resistance, and vinylidene fluoride-hexafluoropropylene-tetrafluoroethylene-based polymer is more preferred.

In order to acquire crosslinkability, FKM may contain a structural unit derived from the crosslinkable moiety-containing monomer having been described previously in the section entitled FFKM.

[Additive]

The fluororubber composition may optionally contain, besides the aforementioned fluororubber, any other known additive, only to the extent that the effects of the present invention will not be degraded.

The additive is exemplified by other polymers other than the fluororubber (fluororesin, for example), crosslinking agent, co-crosslinking agent, antiaging agent, antioxidant, vulcanization accelerator, stabilizer, silane coupling agent, filler (reinforcing agent), plasticizer, flame retardant, waxes, lubricant, solvent, surfactant, dispersant, charge modifier, viscosity modifier, and fiber forming agent.

Each of the additive may be used singly or two or more kinds thereof.

When using the other polymers as the additive, the content of the fluororubber, relative to 100% by mass in total of the fluororubber and such other polymers in the fluororubber composition, accounts for 50% by mass or larger.

The crosslinking agent is appropriately selectable depending on the fluororubber to be used. In an exemplary case with use of FKM, the crosslinking agent is exemplified by peroxide-based, polyamine-based, and polyol-based crosslinking agents; meanwhile with use of FFKM, the crosslinking agent is exemplified by peroxide-based, bisphenol-based, triazine-based, oxazole-based, imidazole-based, and thiazole-based crosslinking agents.

When using the crosslinking agent, the amount used of the crosslinking agent, relative to 100 parts by mass of the fluororubber, is preferably 0.1 parts by mass or more, and more preferably 0.5 parts by mass or more, meanwhile preferably 30 parts by mass or less, and more preferably 10 parts by mass or less.

The peroxide-based crosslinking agent is exemplified by 2,5-dimethyl-2,5-di(t-butylperoxy)hexane, dicumyl peroxide, 2,4-dichlorobenzoyl peroxide, di-t-butyl peroxide, t-butyldicumyl peroxide, benzoyl peroxide, 2,5-dimethyl-2, 5-(t-butylperoxy) hexyne-3,2,5-dimethyl-2,5-di(benzoylperoxy)hexane, α,α'-bis(t-butylperoxy-m-isopropyl)benzene, t-butylperoxyisopropyl carbonate, and p-chlorobenzoyl peroxide.

Any of known co-crosslinking agents (crosslinking aids) can be used as the co-crosslinking agent.

The co-crosslinking agent is exemplified by radically co-crosslinkable compounds (polyfunctional monomers) such as triallyl isocyanurate, triallyl cyanurate, triallyl formal, triallyl trimellitate, N,N'-m-phenylene bismaleimide, dipropargyl terephthalate, diallyl phthalate, and tetraallyl terephthalamide. Among these, triallyl isocyanurate is preferably contained, from the viewpoint of, for example, reactivity, and heat resistance of the obtainable adhesive layer.

When using the crosslinking agent, the amount used of the co-crosslinking agent, relative to 100 parts by mass of the fluororubber, is preferably 0.1 parts by mass or more, and more preferably 0.5 parts by mass or more, meanwhile preferably 30 parts by mass or less, and more preferably 10 parts by mass or less.

The filler is exemplified by functional fillers (for example, heat conductive particle, electro-conductive particle, insulating particle, reinforcing fiber), and specifically exemplified by carbon materials (for example, carbon black, nanocarbon, carbon nanotube, graphite), silica, alumina, zinc oxide, titanium dioxide, clay, talc, diatomaceous earth, barium sulfate, silicic acid compound (silicate, for example), calcium carbonate, magnesium carbonate, calcium oxide, mica, aluminum hydroxide, metal (silver, for example) particle, and fine resin particle.

The filler may have any shape without special limitation, which is exemplified by particle form and fiber form.

When the filler is contained in the fluororubber composition, the content of the filler in the fluororubber composition is preferably 0.1% by mass or more, and preferably 1% by mass or more, meanwhile preferably 80% by mass or less, and more preferably 70% by mass or less, from the viewpoint of, for example, exhibition of physical property such as chemical resistance or heat resistance inherent to the fluororubber, and exhibition of physical property inherent to the filler.

The solvent is not particularly limited as long as it can dissolve or disperse the fluororubber, and is exemplified by water, dimethylacetamide, dimethylformamide, tetrahydrofuran, methylpyrrolidone, xylene, acetone, methyl ethyl ketone, chloroform, ethylbenzene, cyclohexane, benzene, sulfolane, methanol, ethanol, phenol, pyridine, propylene carbonate, acetonitrile, trichloroethane, hexafluoroisopropanol, diethyl ether, and fluorine-containing solvent.

The amount used of the solvent, per 100% by mass of the fluororubber composition, is typically 0% by mass of more, preferably 10% by mass or more, and even more preferably 20% by mass or more, meanwhile preferably 90% by mass or less, and more preferably 80% by mass or less.

<Base>

The base may be one, or two or more. Two or more bases are preferably used for the bonded object (II).

The cases where one base is used are exemplified by a case where the base is deformed both ends thereof to contact (for example a sheet-formed base is rolled to bring both ends thereof into contact), and bonding the thus both ends of the one base with the adhesive layer; and a case where a laminate having the long base 1 and the adhesive 2 arranged thereon, as illustrated FIG. 1, is spirally wound around, for example, a rod or cylindrical member 4 as illustrated in FIG. 2, and then adhered with use of the adhesive 2, so as to obtain the bonded object in the form of, for example, ring or tube (cylinder).

Two or more bases, when used, may be those having for example different material or shape, or may be those having for example the same material or shape.

The base is exemplified by, but not particularly limited to, those that contain at least one selected from resin, carbon material, glass, or metal.

The base preferably uses at least one selected from nonwoven fabric, woven fabric, porous membrane, and fiber, and more preferably uses at least one selected from nonwoven fabric, woven fabric, and porous membrane from the viewpoint of, for example, easily obtaining the bonded object having the bases bonded therein tightly enough, and shaped in a desired form.

[Resin]

The resin is exemplified by, but not particularly limited to, fluororesin, engineering plastics, and other plastics other than these. Among these, fluororesin and engineering plastics are preferred.

[Fluororesin]

The fluororesin is not particularly limited, to which any of known fluororesin is applicable. The fluororubber contained in the fluororubber composition and the fluororesin that constitutes the base may be the same or different, and are preferably different. The fluororesin that constitutes the base preferably has a crystallinity higher than that of the fluororubber contained in the fluororubber composition.

The fluororesin is exemplified by polytetrafluoroethylene (PTFE), tetrafluoroethylene-perfluoroalkyl vinyl ether copolymer (PFA), tetrafluoroethylene-hexafluoropropylene copolymer (FEP), ethylene-tetrafluoroethylene copolymer (ETFE), tetrafluoroethylene-hexafluoropropylene-perfluoroalkyl vinyl ether copolymer (EPE), fluoroethylene-vinyl ether copolymer (FEVE), poly(chlorotrifluoroethylene) (PCTFE), ethylene-chlorotrifluoroethylene-copolymer (ECTFE), polyvinylidene fluoride (PVDF), polyvinyl fluoride (PVF), vinylidene fluoride-hexafluoropropylene copolymer (VDF-HFP copolymer), and vinylidene fluoride-hexafluoropropylene-tetrafluoroethylene copolymer (VDF-HFP-TFE copolymer). Among these, PTFE and PFA are preferred.

[Engineering Plastics]

The engineering plastics are not particularly limited, to which any of known engineering plastics are applicable, and are specifically exemplified by polyphenylene sulfide-based resin (PPS); polysulfone-based resin; polyethersulfone-based resin; polyetheretherketone-based resin (PEEK); polyarylate-based resin; liquid crystal polymer; aromatic polyester-based resin; polyimide-based resin; polyamideimide-based resin; polyetherimide-based resin; aramid-based resin; polycarbonate-based resin; polyacetal-based resin; polyester-based resins such as polyethylene terephthalate (PET), polybutylene terephthalate (PBT) and polycyclohexylene dimethyl terephthalate (PCT); polyphenylene ether-based resin; polyphenylene oxide-based resin; polyamide-based resins such as nylon 6, nylon 66 and aromatic polyamide; (meth)acryl-based polymer; vinyl chloride-based polymer; vinylidene chloride-based polymer; polybenzazole-based resins (polybenzimidazole (PBI), for example); olefin-based resins such as polyethylene (ultrahigh molecular weight polyethylene, for example) and polypropylene (ultrahigh molecular weight polypropylene, for example).

[Other Plastics]

The other plastics are not particularly limited as long as they are resins other than the fluororesin and engineering plastics, to which any of known plastic is applicable. The other plastics are specifically exemplified by polyvinyl chloride (PVC), polystyrene (PS), acrylonitrile butadiene styrene resin (ABS), polymethyl methacrylate resin (PMMA), and thermosetting resins such as phenol resin (including straight phenol resin, and various modified phenol resins), melamine resin, and epoxy resin.

The base that contains the resin may contain fiber such as carbon fiber and glass fiber, or other component such as the additives having been described in the section entitled Adhesive Layer.

Shape of the base that contains the resin is exemplified by fiber, porous membrane (including stretched porous membranes), nonwoven fabric, woven fabric, and film.

When using a resin-containing film as the base, the film is preferably roughened on the surface thereof to be contacted with the adhesive layer, by any of known methods, from the viewpoint that, for example, the bonded object having the bases bonded therein tightly enough will be obtainable. Since the resin-containing films are difficult to be bonded, so that, when using the resin-containing film as the base, another base to be bonded with the film is preferably a carbon dioxide-permeable base, which is exemplified by fiber, porous membrane, nonwoven fabric, or woven fabric.

[Carbon Material]

The carbon material-containing base is exemplified by those containing carbon fiber, carbon nanotube, or graphite sheet. Shape of the carbon fiber-containing base is exemplified by fiber, filament, cloth, felt, mat, paper, and prepreg, without special limitation.

[Glass]

The glass-containing base is exemplified by glass fiber, glass woven fabric, and glass nonwoven fabric, and is specifically exemplified by glass cloth, glass paper, glass mat, glass felt, and any of these bases having on the surface thereof the aforementioned resin.

[Metal]

The metal-containing base is exemplified by metal woven fabric, a metal nonwoven fabric, and metal fiber (including wooly metal). The metal-containing base may be any of those obtainable by metal treatment a support such as fiber, porous membrane, nonwoven fabric, or woven fabric (for example, base obtainable by plating the support, base obtainable by performing metal deposition on the support).

The metal is exemplified by stainless steel, aluminum, aluminum alloy, nickel, nickel alloy, titanium, titanium alloy, copper, copper alloy, gold, gold alloy, silver, silver alloy, tantalum, tantalum alloy, chromium, chromium alloy, molybdenum, molybdenum alloy, tungsten, and tungsten alloy.

The base is preferably formed of fluororesin, and more preferably formed of, for example, PTFE or PFA from the viewpoint of, for example, easiness of manufacturing the bonded object that excels in mechanical strength, heat resistance, chemical resistance, weather resistance, and electrical insulation, and easiness of acquisition of the bonded object whose structural component is fluorine component only.

The bonded object whose structural component is fluorine component only has, however, not been obtainable while achieving a sufficient bond strength of the bases and a desired shape, since the fluorine component is non-adhesive and has a small coefficient of friction. In contrast, the bonded object with the bases bonded therein tightly enough and with a desired shape is easily obtainable according to an embodiment of the present invention, even if formed of the fluorine component only.

The nonwoven fabric, woven fabric, porous membrane, fiber (tube), and film (sheet) usable here may be any of known nonwoven fabric, woven fabric, porous membrane, fiber (tube), and film (sheet), without special limitation.

The base may be any of those having been, for example, functionalized by, for example, known surface treatment, such as hydrophilization. According to an embodiment of the present invention, the bonded object is obtainable even with use of, for example, the thus functionalized base, without losing the function.

The fiber that constitutes the nonwoven fabric or woven fabric, or the fiber as the base preferably has an average fiber diameter of 0.01 μm or larger, more preferably 0.1 μm or larger, and even more preferably 0.5 μm or larger, meanwhile preferably 100 μm or smaller, more preferably 50 μm or smaller, and even more preferably 20 μm or smaller.

With the average fiber diameter controlled within these ranges, the bonded object having excellent mechanical strength, in which the bases are bonded with a sufficient bond strength, and being desirably shaped is easily obtainable.

The average fiber diameter in this specification is an average value estimated from results of measurement of the fiber, obtainable by observing the fiber (group) to be measured, under a scanning electron microscope (SEM) (for example at a 2000× magnification), by randomly choosing 20 fibers on the obtained SEM image, and by measuring the fiber diameter (long diameter) of the individual fibers.

The fiber that constitutes the nonwoven fabric or woven fabric, or the fiber as the base preferably has a coefficient of variation of the fiber diameter, estimated from the equation below, of 0.7 or smaller, which is more preferably 0.01 to 0.5. With the coefficient of variation of fiber diameter controlled within the aforementioned ranges, the fiber diameter becomes uniform, and the bonded object having excellent mechanical strength, in which the bases are bonded with a sufficient bond strength, and being desirably shaped is easily obtainable.

$$\text{Coefficient of variation of fiber diameter} = \text{Standard deviation} / \text{Average fiber diameter}$$

("Standard deviation" is a standard deviation of the fiber diameter of the aforementioned 20 fibers.)

The fiber that constitutes the nonwoven fabric or woven fabric, or the fiber as the base preferably has a fiber length of 0.5 mm or longer, although not particularly limited, which is more preferably 1 mm or longer, meanwhile preferably 100 mm or shorter, and more preferably 50 mm or shorter.

The stretched porous membrane is not specifically limited, and may be uniaxially stretched porous membrane or biaxially stretched porous membrane.

The nonwoven fabric, woven fabric, or porous membrane may have a porosity not specifically limited, which is typically 0.1% by volume or larger, and more preferably 30% by volume or larger, meanwhile typically 95% by volume or smaller, and preferably 90% by volume or smaller.

The porosity in this specification can be estimated from the equation below, which uses a difference between a theoretical volume, estimated with use of specific gravity of a material that constitutes the nonwoven fabric, woven fabric, or porous membrane, and a measured mass of such nonwoven fabric, woven fabric, or porous membrane, while assuming the material to be void-free; and an actual volume estimated by measuring dimensions of the nonwoven fabric, woven fabric, or porous membrane.

$$\text{Porosity (\% by volume)} = (1-(\text{Theoretical volume}/\text{Actual volume}))\times100$$

The nonwoven fabric, woven fabric, or porous membrane preferably has a basis weight of 100 $g/m^2$ or smaller, which is more preferably 1 to 80 $g/m^2$.

The nonwoven fabric, woven fabric, porous membrane, or film (sheet) usually has a thickness of 5 $\mu m$ or larger, which is preferably 10 $\mu m$ or larger, meanwhile usually 1 mm or smaller, and preferably 500 $\mu m$ or smaller.

The nonwoven fabric, woven fabric, porous membrane, or film (sheet) may be composed of a single layer, or composed of two or more layers that are the same or different.

<<Method for Manufacturing Bonded Object>>

A method for manufacturing a bonded object according to an embodiment of the present invention (also referred to as "the present method", hereinafter) includes:

Step I for preparing a structure having bases and an adhesive arranged between the bases; and Step II for joining the structure in the presence of liquid or gaseous carbon dioxide;

the adhesive being obtained from a fluororubber composition having a Mooney viscosity ML 1+10 at 121° C., measured in accordance with ASTM D1646, of 80 to 115.

According to the present method, the present bonded object can be manufactured.

A specific example of a method for manufacturing the bonded object (I) according to an embodiment of the present method (also referred to as "the present method (I)", hereinafter) includes:

between the Steps I and II in the present method:

Step 1 for placing the structure obtained in Step I, in a pressure vessel; and

Step 2 for introducing carbon dioxide into the pressure vessel having placed therein the structure obtained in Step 1.

Step 2 may take place as a step substantially the same as Step II.

A specific example of the method for manufacturing the bonded object (II) according to an embodiment of the present method (also referred to as "the present method (II), hereinafter) includes:

Step 4 for press-bonding (bonding by press-bonding) the bases.

The base is preferably formed of a fluororesin. In this aspect, the present method may be understood to be a novel method for processing a base made of a less-workable fluororesin.

According to the present method, the bonded object may be manufactured in a short time at low cost at a temperature of approximately 50° C. or below, without needing high temperature enough to melt, for example, the resin that compose the base; the obtainable bonded object basically will have no carbon dioxide remained therein, and therefore excels in safety, controllability and productivity; making it possible to easily manufacture a clean bonded object that excels in mechanical strength, having the bases bonded therein tightly enough, and having a desired shape. In particular, the bonded object is obtainable while maintaining, for example, the physical property, shape, and function inherent to the bases.

According to the present method, the bonded object that contains any functional material employed depending on desired applications is obtainable, while maintaining for example the function and property inherent to the functional material, even if the functional material is poorly heat resistant.

According to the present method (I) capable of forming the bonded object without pressing the bases, the bonded object is obtainable at low energy cost in a simplified process.

According to the present method (I) also capable of forming a plurality of bonded objects at one processing (Step 2), by placing a plurality of the structures in the pressure vessel, so that the plurality of bonded objects is obtainable at lower energy cost in a simplified process.

Although the reason why the bonded object is obtainable by the present method (I), with excellent mechanical strength, with the bases bonded therein tightly enough, and with a desired shape, remains partially unclear, this is presumably because the fluororubber in the adhesive is plasticized by carbon dioxide introduced into the pressure vessel, and the plasticization made the bases meshed each other to fix the shape, bonded or joined.

Although the reason why the bonded object is obtainable by the present method (II), with excellent mechanical strength, with the bases press-bonded therein tightly enough, and with a desired shape, remains partially unclear, this is presumably because the fluororubber in the adhesive is plasticized by carbon dioxide under pressure in the presence of liquid or gaseous carbon dioxide, during which carbon dioxide that was brought into a subcritical state further promoted the plasticization, making the bases meshed each other to fix the shape, bonded or joined.

[Adhesive]

The adhesive used in the present method may be any of those obtainable from the fluororubber composition having the Mooney viscosity within the aforementioned ranges without special limitation, and is preferably similar to the fluororubber composition having been described in the section entitled Adhesive Layer.

The adhesive is specifically exemplified by liquid or paste form fluororubber composition (the fluororubber composition per se serves as the adhesive); dried product of the liquid or paste form fluororubber composition (the dried product per se serves as the adhesive); and fiber, nonwoven fabric, or film obtained from the fluororubber composition (the fiber, nonwoven fabric or film per se serves as the adhesive).

One kind, or two or more kinds of the adhesive may be used in the present method.

The liquid or paste form fluororubber composition may contain a solvent capable of dispersing or dissolving the fluororubber. In this case, the solvent capable of dissolving the fluororubber is preferably contained.

In the present invention, the liquid form and the paste form are not particularly discriminated.

The fluororubber composition that contains the solvent preferably has a fluororubber content of preferably 0.01% by mass or more, which is more preferably 0.5% by mass or more, meanwhile preferably 20% by mass or less, and more preferably 10% by mass or less.

According to the present method, the bonded object will be obtainable while maintaining the shape of the adhesive or the bases to be employed. From the viewpoint of more enhanced demonstration of the effects of the present method, it is preferred to use a fiber or nonwoven fabric obtained from the fluororubber composition as the adhesive, and to use a base selected from a nonwoven fabric, a woven fabric, and a porous membrane as the base. Use of such adhesive and bases makes it possible to obtain the full-porous bonded object whose entire body is porous.

The fiber used as the adhesive, or the fiber that constitutes the nonwoven fabric used as the adhesive preferably has an average fiber diameter of 0.1 μm or larger, and more preferably 0.5 μm or larger, meanwhile preferably 5 μm or smaller, and more preferably 3 μm or smaller.

The fiber used as the adhesive, or the fiber that constitutes the nonwoven fabric used as the adhesive preferably, but not restrictively, has an average fiber length of 0.1 mm or longer, which is preferably 0.5 mm or longer, and even more preferably 1 mm or longer, meanwhile preferably 1000 mm or shorter, more preferably 100 mm or shorter, and even more preferably 50 mm or shorter.

The nonwoven fabric used as the adhesive typically, but not restrictively, has a porosity of 0.1% by volume or larger, which is more preferably 30% by volume or larger, meanwhile typically 95% by volume or smaller, and preferably 90% by volume or smaller.

The nonwoven fabric used as the adhesive preferably has a basis weight of 100 g/m$^2$ or smaller, which is more preferably 1 to 80 g/m$^2$.

Thickness of the nonwoven fabric or film used as the adhesive, although suitably selectable, is usually 1 μm or larger, which is preferably 3 μm or larger, meanwhile usually 1 mm or smaller, and preferably 200 μm or smaller.

The nonwoven fabric used as the adhesive may be composed of a single layer, or two or more layers having different materials or fiber diameters.

The fiber or nonwoven fabric used as the adhesive is preferably manufactured by Step A that includes spinning of the fluororubber composition.

Step A

Step A is exemplified by electrospinning, melt spinning, melt electrospinning, and spunbonding (meltblowing). Among these, electrospinning and melt spinning are preferred. Electrospinning is particularly preferred from the viewpoint that, for example, the fiber having a desired shape may be easily spun, the fiber having a small fiber diameter is obtainable, and the nonwoven fabric, for example, obtainable with use of the fiber will tend to have large porosity and large specific surface area.

When Step A is carried out by electrospinning, the obtainable fiber may occasionally be formed on a collector. In this case, the nonwoven fabric is formed on the collector. Hence, an embodiment of Step A may also be understood as a method for manufacturing a nonwoven fabric.

Specifically, the nonwoven fabric may be formed for example by conducting a step of forming the fiber, for example, by electrospinning, concurrently with a step of accumulating the thus formed fiber in a sheet-form to form the nonwoven fabric; or by conducting the fiber forming, followed by accumulating the thus formed fiber in a sheet-form, for example, by wet papermaking, water punching, chemical bonding, thermal bonding, spunbonding, needle punching, or stitch bonding.

For the fiber or nonwoven fabric when formed by electrospinning, the fluororubber composition that optionally contains a solvent is preferably used.

If, for example, the fluororubber is less soluble to the solvent in the fluororubber composition, one kind, or two or more kinds of fiber forming agents are preferably contained from the viewpoint of, for example, maintaining the fluororubber in a fiber form during the spinning.

The fiber forming agent is preferably an organic polymer highly soluble to the solvent, which is exemplified by polyethylene oxide, polyethylene glycol, dextran, alginic acid, chitosan, starch, polyvinylpyrrolidone, polyacrylic acid, polymethacrylic acid, polyacrylamide, cellulose, and polyvinyl alcohol.

The amount used of the fiber forming agent, when used the fiber forming agent, depends on the viscosity of the solvent, and solubility to the solvent, and is typically 0.1% by mass of more, preferably 1% by mass or more, meanwhile typically 15% by mass or less, and more preferably 10% by mass or less based on 100% by mass of the fluororubber composition.

Conditions for the electrospinning are exemplified typically as below.

Applied voltage (applied voltage between a spinning nozzle and a fiber collector) is preferably 1 kV or higher, more preferably 5 kV or higher, and even more preferably 10 kV or higher, meanwhile preferably 100 kV or lower, more preferably 50 kV or lower, and even more preferably 40 kV or lower.

Spinning distance (distance between the spinning nozzle and the fiber collector) is preferably 5 to 30 cm.

Discharge rate of the fluororubber composition is preferably 0.01 to 3 ml/min.

Tip diameter (outer diameter) of the spinning nozzle used for electrospinning is preferably 0.1 mm or larger, more preferably 0.2 mm or larger, meanwhile preferably 2.0 mm or smaller, and more preferably 1.6 mm or smaller.

Spinning atmosphere, although not always necessarily be controlled, is preferably controlled to have a relative humidity of typically 10 to 50%, and to have a temperature of typically 10 to 35° C.

The fiber collector used here may be a rotary collector or a flat plate collector. With use of the rotary collector while rotating a drum, the fiber injected from the spinning nozzle is wound by the drum, by which the nonwoven fabric having the fiber oriented therein in a certain direction is obtainable. The rotation speed of the rotary collector is typically 50 to 5,000 rpm. With use of the flat plate fiber collector, the nonwoven fabric formed of non-oriented fibers is obtainable.

The melt spinning may be conducted, for example, by melting the fluororubber composition under heating, and by extruding it through a spinneret (nozzle) to form the fiber, followed by cooling. Specific method of the melt spinning may follow any of known methods depending on the material to be used, without special limitation.

Step B

Although the fiber or nonwoven fabric used as the adhesive may be manufactured by the Step A only, the Step A is preferably followed by Step B for crosslinking a fiber obtained in the Step A, from the viewpoint, for example, that the fiber can maintain the fiber form (porous form, nonwoven fabric form) obtained in the Step A over a long period, and that the fiber having improved tensile properties such as tensile strength and tensile modulus will be easily obtainable.

Such Step B, when conducted, makes it possible to obtain the fiber or nonwoven fabric that contains at least either crosslinked FKM or crosslinked FFKM.

The Step B is specifically exemplified by a step of irradiating radiation ray on the fiber or nonwoven fabric obtained in the Step A (radiation crosslinking), and a step of applying heat to the fiber or nonwoven fabric obtained in the Step A (thermal crosslinking). Among these, the radiation crosslinking is preferred from the viewpoint, for example, that the crosslinking may be completed within a short time, and that the fiber form (porous form, nonwoven fabric form) obtained in the Step A will be easily maintainable.

Now, the fiber obtained in the Step A may be a fiber immediately after extruded for example from the nozzle, or may be a fiber (nonwoven fabric) after accumulated for example on the collector.

The radiation ray is exemplified by X-ray, gamma ray, electron beam, proton beam, neutron beam, heavy particle beam, alpha ray, and beta ray. Among these, electron beam is preferred.

One type, or two or more types of radiation ray may be irradiated.

The radiation crosslinking may follow any of known methods. Conditions in a case where electron beam is irradiated may be for example as follows.

The electron beam is irradiated so as to control the absorbed dose to preferably 5 kGy or more, more preferably 10 kGy or more, and even more preferably 20 kGy or more, meanwhile preferably 500 kGy or less, more preferably 300 kGy or less, and even more preferably 150 kGy or less.

In an exemplary case with use of the adhesive layer formed of the fiber or nonwoven fabric as described above, the absorbed dose is preferably 30 to 100 kGy, from the viewpoint of, for example, easily obtaining the bonded object whose adhesive layer maintains the shape of the fiber or nonwoven fabric. The absorbed dose is preferably 30 to 70 kGy, from the viewpoint, for example, of easily obtaining the bonded object whose adhesive layer maintains the shape of the fiber or nonwoven fabric, and of easily obtaining the bonded object that excels in bond strength.

The radiation ray is preferably irradiated in an atmosphere of inert gas such as nitrogen or argon, from the viewpoint, for example, that the crosslinking reaction is less likely to be inhibited, and that the fiber or nonwoven fabric that excels in mechanical property is easily obtainable.

Heating conditions in the thermal crosslinking may be set for example according to the chemical composition of the fluororubber composition to be used, and is exemplified by a heating temperature of 150 to 200° C., and a heating time of 1 to 24 hours.

<Step I>

Step I is not particularly limited as long as it is a step for preparing a structure having the bases and the adhesive arranged between the bases. One or more kinds of functional material required for application may be used according to the required application. The functional material is exemplified by materials same as those having been described in the section entitled Bonded Object.

The method for arranging the adhesive between the bases is exemplified by, but not particularly limited to, a method in which the adhesive such as the fiber (including a linear adhesive), woven fabric or a nonwoven fabric (including a grid-like adhesive), or a film (including spherical, particular, and dot-like adhesive) is preliminarily formed from the fluororubber composition, and the adhesive is then arranged between the bases; and a method in which the bases are immersed in a liquid or paste form adhesive, or the liquid or paste form adhesive is coated on the bases according to a desired pattern (for example, film, line, dot, or grid pattern), and the bases are arranged so as to hold the adhesive in between (the adhesive may be optionally dried, before being arranged between the bases, or after arranged between the bases).

When arranging the adhesive between the bases, two or more bases may be stacked while placing the adhesive in between; or a single base may be deformed to contact both ends thereof (for example, the base in a sheet form is rolled so as to bring both ends into contact), and the adhesive may be arranged between both ends of the single base thus brought into contact; or the laminate having a long base 1 and the adhesive 2 arranged thereon as illustrated in FIG. 1 may be spirally wound for example around the rod or cylindrical member 4 as illustrated in FIG. 2, so as to arrange the adhesive 2 between the base 1 (note that reference numeral 3 in FIG. 2 denotes the overlapped part structured as base/adhesive (adhesive layer)/base, in which the adhesive 2 is arranged between the face of the base 1 having the adhesive 2 arranged thereon in the laminate illustrated in FIG. 1, and the face of the base opposite to the face having the adhesive 2 arranged thereon in the laminate illustrated in FIG. 1).

Note that the adhesive may be arranged between the bases, while optionally winding the bases or the adhesive around an auxiliary member such as rod.

The structure is alternatively obtainable by a process such as once bonding one base with the adhesive in the presence of liquid or gaseous carbon dioxide to form a preliminary body, and then by arranging the thus obtained preliminary body and a desired base to be bonded to the preliminary body, optionally with use of the adhesive, so as to place the adhesive between the bases.

The structure, particularly intended for use for the present method (I), necessarily keeps the shape as it is, so that the bases and the adhesive are preferably kept in contact, by temporary fixation with a temporal fixing means, or, by pressurizing (shape-memorizing) for example with hands or a device.

The temporary fixing means is exemplified by clip, spring, tape, stapler, screw, nail, needle, rubber band, cable tie, weight, and magnet.

<Step 1>

Step 1 is not particularly limited as long as it is a step for placing the structure obtained in Step I in a pressure vessel. When placing the structure having the bases and the adhesive arranged between the bases, one structure may be placed in a pressure vessel, or a plurality of structures may be placed in a pressure vessel.

The pressure vessel is not particularly limited as long as it can withstand the pressure of carbon dioxide introduced in Step 2. The pressure vessel may be sized corresponding to the bonded object to be formed.

The pressure vessel is exemplified by a vessel equipped with, for example, a carbon dioxide introduction unit, a valve for regulating the introduction volume of carbon dioxide, a carbon dioxide discharge unit, and a valve for regulating discharge.

<Step 2>

Step 2 is not particularly limited as long as it is a step for introducing carbon dioxide into the pressure vessel having placed therein the structure obtained in the Step 1. Liquid or gaseous carbon dioxide is preferably introduced. The bonded object is thus formed in Step 2.

Although carbon dioxide to be introduced might be in a subcritical state or in a supercritical state, it is preferred not to use the subcritical or supercritical carbon dioxide, since, for example, carbon dioxide can be introduced without use of, for example, a device with a heating mechanism and the like.

From the viewpoint of, for example, easily obtaining the bonded object having the bases bonded therein tightly enough, without losing for example the physical property, shape, and function inherent to the bases before bonded, carbon dioxide is preferably introduced into the pressure vessel so that the pressure thereof in the pressure vessel is adjusted to 3 MPa or higher, which is more preferably 4 MPa or higher, and even more preferably 5 MPa or higher.

Step 2 preferably does not carry out pressing with use of a pressing means.

Specific pressure (pressure in the direction of stacking of the bases) for the bonding in Step 2 is appropriately select-able for example depending on the type of bases to be used, the amount of adhesive, and a desired shape of the bonded object, and is preferably 10 $gf/cm^2$ or larger, and more preferably 100 $gf/cm^2$ or larger, meanwhile preferably 1000 $gf/cm^2$ or smaller, and more preferably 500 $gf/cm^2$ or smaller.

With the specific pressure controlled within the aforementioned ranges, the bonded object is easily formable with the bases bonded therein tightly enough, substantially without losing the shape of the bases before bonded (for example, shapes of void and fiber inherent to, for example, the nonwoven fabric).

In Step 2, the fluororubber may supposedly be melted while aided by melting point depression as a result of impregnation of carbon dioxide into the fluororubber in the adhesive, thus making it possible to form the bonded object without heating.

Step 2 is therefore preferably conducted at a temperature lower than the temperature at which the fluororubber melts, preferably at around 50° C. or below, and more preferably without external heating, from the viewpoint, for example, that the function of the base will not be degraded, that the base will be selectable with a wide freedom of choice, and that the bonded object, even if containing a functional material which is poor in heat resistance, will retain function and property of such functional material.

The temperature in Step 2 is usually 0° C. or higher, and preferably 20° C. or higher, meanwhile usually 40° C. or lower, and preferably 30° C. or lower.

Time of Step 2 (time of adhesion) is appropriately select-able depending, for example, on the bases to be used, and type or amount of the adhesive, which is preferably 0.2 seconds or longer, and more preferably 1 second or longer, meanwhile preferably 15 minutes or shorter, and more preferably 5 minutes or shorter.

<Step 3>

The temporal fixing means, if used in the aforementioned Step I, is usually removed after completion of Step 2.

In an embodiment of the present invention, the bonded object obtained after Step 3 may further be subjected to a secondary process for bonding with other base, unlike a bonded object obtained by thermal fusion.

<Step 4>

Step 4 is not particularly limited as long as it is a step, conducted as Step II, for press-bonding (bonding under pressure) the bases, that is, a step for press-bonding the bases in the structure obtained in Step I, in the presence of liquid or gaseous carbon dioxide.

The liquid or gaseous carbon dioxide is preferably carbon dioxide in the form of liquid, gas-liquid mixture, or near-liquid, from the viewpoint, for example, that the fluororubber may be thought to be quickly plasticized, and that the bonded object that further excels in bond strength will be easily obtainable.

Although subcritical or supercritical state of carbon dioxide may be used in Step 4, it is preferred not to use the subcritical or supercritical state of carbon dioxide, since the press bonding may take place under a reduced pressing force, without use of, for example, a device with a heating mechanism and the like.

As has been described previously, if press-bonded in the presence of liquid or gaseous carbon dioxide, the fluororubber in the adhesive is supposedly impregnated with carbon dioxide to be plasticized, making it possible to manufacture the bonded object without heating.

Step 4 is therefore preferably conducted at a temperature lower than the temperature at which the fluororubber melts, preferably at around 50° C. or below, and more preferably without external heating, from the viewpoint, for example, that the function of the base will not be degraded, that the base will be selectable with a wide freedom of choice, and that the bonded object, even if containing a functional material which is poor in heat resistance, will retain function and property inherent to such functional material.

Now, the temperature for press bonding in Step 4 is usually 0° C. or higher, and preferably 20° C. or higher, meanwhile usually 40° C. or lower, and preferably 30° C. or lower.

Specifically, Step 4 is preferably conducted by introducing liquid or gaseous carbon dioxide into the system.

Into the system where liquid or gaseous carbon dioxide is introduced, sequential order of introduction of the structure and carbon dioxide is not particularly limited, for example allowing that the system is preliminarily filled with carbon dioxide, and the structure is then placed therein. It is however preferred to place the structure into the system, and carbon dioxide is then introduced therein.

Carbon dioxide, when introduced in the liquid form, does not need compression process for liquefaction, so that the bonded object may be manufactured in shorter time as compared with a case where gaseous carbon dioxide is introduced.

On the other hand, carbon dioxide, when introduced in the gaseous form, needs only a simple process, also possibly making a pressure pump no longer necessary, so that the equipment may be simplified as compared with a case where liquid carbon dioxide is introduced. When introducing gas-eous carbon dioxide, the introduced carbon dioxide may be liquefied under pressure. In this case, it suffices that at least a part of the introduced carbon dioxide is liquefied, rather than liquefying the entire thereof.

The amount of carbon dioxide to be introduced is not particularly limited. Carbon dioxide, when introduced in the form of gas for the press bonding at a temperature of 31° C. (critical temperature of carbon dioxide) or above, is typically introduced so that the density of carbon dioxide during the press bonding will be 0.4 g/mL (approximately half of the density of liquid carbon dioxide) or larger.

From another viewpoint of easily forming the bonded object having the bases bonded therein tightly enough, carbon dioxide, if in the form of gas, is preferably introduced so that carbon dioxide introduced into the system will have a pressure of preferably 3 MPa or higher, which is more preferably 4 MPa or higher, and even more preferably 5 MPa or higher.

Specific pressure during the press bonding in Step 4 is appropriately selectable, depending, for example, on the type and amount of the bases to be used, and desired shape of the bonded object, which is preferably 4 MPa or higher, and more preferably 5 MPa or higher, with the upper limit typically, but not restrictively, adjusted to 50 MPa or lower.

Now, the specific pressure is defined by the sum of the pressure of carbon dioxide introduced into the system, and the press pressure (or, only the pressure of carbon dioxide introduced into the system, if not pressed).

Time of press bonding in Step 4 is appropriately selectable depending, for example, on the bases to be used, type or amount of the adhesive, and specific pressure or temperature for press bonding, which is preferably 0.2 seconds or longer, and more preferably 1 second or longer, meanwhile preferably 15 minutes or shorter, and more preferably 5 minutes or shorter.

Step 4 may take place in a sealed vessel which is allowed for volume reduction, or in an open-system press machine.

The sealed vessel is exemplified by a vessel having an introduction unit that introduces liquid or gaseous carbon dioxide into a closed space, and a carbon dioxide discharge unit, as well as a unit, such as a piston, that can reduce the volume of the sealed vessel to press the bases.

Use of the open-system press machine enables spot processing of the object to be processed, without using a large container that can cover the entire base to be processed, and also enables serial manufacturing of the bonded object, for example by repeating feeding of the bases and pressing of the bases every time at a different position, or by pressing the bases with use of a roller, rather than the piston.

In an embodiment of the present invention, the bonded object obtained after Step 4 may further be subjected to a secondary process for bonding with other base, unlike the bonded object obtained by thermal fusion.

EXAMPLES

Next, an embodiment of the present invention will further be detailed referring to Examples, to which the present invention is by no means limited.

Production Example 1

A fluororubber composition was prepared by dissolving 70% by mass of FKM1 (DAI-EL G-901H, from Daikin Industries, Ltd., Mooney viscosity (ML 1+10) at 121° C. measured in accordance with ASTM D1646: 135), and 30% by mass of FKM2 (DAI-EL G-902, from Daikin Industries, Ltd., Mooney viscosity (ML 1+10) at 121° C. measured in accordance with ASTM D1646: 21), in methyl ethyl ketone (special grade, from FUJIFILM Wako Pure Chemical Corporation), so as to adjust the total concentration of FKM to 20% by mass.

The obtained fluororubber composition was found to have a Mooney viscosity (ML 1+10) at 121° C., measured in accordance with ASTM D1646, of 96.

The thus prepared fluororubber composition was then directly spun into fluororubber fibers (uncrosslinked fluororubber nonwoven fabric) on an aluminum foil-laminated collector, with use of an electrospinning device (from MECC Co., Ltd.), under the following conditions.

(Spinning Conditions)

Voltage: 25 kV
Discharge rate: 2.0 ml/min
Discharge time: 1 hour
Drum rotation speed: 300 rpm The obtained uncrosslinked fluororubber nonwoven fabric was observed under a SEM (S-3400N, from Hitachi High-Technologies Corporation, the same will apply also to the later-described SEMs), to confirm that the fiber that constitutes the nonwoven fabric has a fibrous form. The obtained uncrosslinked fluororubber nonwoven fabric was found to be 20 μm thick, and the fiber that constitutes the uncrosslinked fluororubber nonwoven fabric was found to have an average fiber diameter of approximately 1 μm.

The obtained uncrosslinked fluororubber nonwoven fabric was peeled off from the aluminum foil, to prepare an adhesive layer A.

Production Example 2

An uncrosslinked fluororubber nonwoven fabric was formed in the same manner as in Production Example 1, the uncrosslinked fluororubber nonwoven fabric was then irradiated with electron beam (EB) with use of an EB device (CB250/30/20 mA, from Iwasaki Electric Co., Ltd.), and the aluminum foil was peeled off, to prepare a crosslinked fluororubber nonwoven fabric. In this process, the electron beam was irradiated at room temperature (21° C.) in a $N_2$ atmosphere, with the adsorbed dose adjusted to 100 kGy. Conveyance speed was adjusted to 5 m/min.

The obtained crosslinked fluororubber nonwoven fabric was observed on a SEM image, to confirmed that fiber that constitutes the nonwoven fabric has a fibrous form. The obtained crosslinked fluororubber nonwoven fabric was found to be 20 μm thick, and the fiber that constitutes the crosslinked fluororubber nonwoven fabric was found to have an average fiber diameter of approximately 1 μm.

The obtained crosslinked fluororubber nonwoven fabric was cut into a size of 5 mm×20 mm quadrilateral, to manufacture an adhesive layer B.

Production Example 3

A fluororubber composition was prepared in the same manner as in Production Example 1, except that the amounts of usage of FKM1 and FKM2 in Production Example 1 were changed to 80% by mass and 20% by mass, respectively.

The obtained fluororubber composition was found to have a Mooney viscosity (ML 1+10) at 121° C., measured in accordance with ASTM D1646, of 109.

A crosslinked fluororubber nonwoven fabric was manufactured in the same manner as in Production Example 2, except that the obtained fluororubber composition was used.

Production Example 4

A fluororubber composition was prepared in the same manner as in Production Example 1, except that the amounts of usage of FKM1 and FKM2 in Production Example 1 were changed to 90% by mass and 10% by mass, respectively.

The obtained fluororubber composition was found to have a Mooney viscosity (ML 1+10) at 121° C., measured in accordance with ASTM D1646, of 120.

A crosslinked fluororubber nonwoven fabric was manufactured in the same manner as in Production Example 2, except that the obtained fluororubber composition was used.

The obtained crosslinked fluororubber nonwoven fabric was cut into a size of 5 mm×20 mm quadrilateral, to manufacture an adhesive layer D.

Production Example 5

A fluororubber composition was prepared in the same manner as in Production Example 1, except that the amounts of usage of FKM1 and FKM2 in Production Example 1 were changed both to 50% by mass.

The obtained fluororubber composition was found to have a Mooney viscosity (ML 1+10) at 121° C., measured in accordance with ASTM D1646, of 69.

A crosslinked fluororubber nonwoven fabric was manufactured in the same manner as in Production Example 2, except that the obtained fluororubber composition was used.

The obtained fluororubber nonwoven fabric was cut into a size of 5 mm×20 mm quadrilateral, to manufacture an adhesive layer E.

Production Example 6

A fluororubber nonwoven fabric was manufactured in the same manner as in Production Example 1, except that the amounts of usage of FKM1 and FKM2 in Production Example 1 were changed to 60% by mass and 40% by mass, respectively.

The obtained fluororubber composition was found to have a Mooney viscosity (ML 1+10) at 121° C., measured in accordance with ASTM D1646, of 86.

The obtained crosslinked fluororubber nonwoven fabric was cut into a size of 5 mm×20 mm quadrilateral, to manufacture an adhesive layer F.

Example 1

A laminate having two sheets of nonwoven fabric formed of a PTFE nanofiber hydrophilized with PVA (from ZEUS Industrial Products, Inc., basis weight: 24 g/m², and the adhesive layer A manufactured in Production Example 1 (the adhesive layer A cut in a size of 5 mm×20 mm quadrilateral) placed in between the two sheets of nonwoven fabric, was temporarily clipped on, at a part where the three members of the laminate are arranged as overlapped.

The thus temporarily clipped laminate was placed in a pressure vessel equipped with a pressure gauge, a carbon dioxide introduction unit, and a carbon dioxide discharge unit, gaseous carbon dioxide was slowly introduced into the pressure vessel over one minute (final pressure in the pressure vessel: 5 MPa), carbon dioxide was immediately discharged, and the laminate was then unclipped, to manufacture a bonded object.

The obtained bonded object was found to have two sheets of nonwoven fabric formed of hydrophilized PTFE nanofibers, bonded therein tightly enough.

Example 2

A bonded object was prepared in the same manner as in Example 1, except that one sheet of nonwoven fabric formed of PTFE nanofiber hydrophilized with PVA, and one sheet of nonwoven fabric formed of unhydrophilized PTFE nanofiber (from ZEUS Industrial Products, Inc., basis weight: 40 g/m², 30 mm square) were used, in place of two sheets of nonwoven fabric formed of PTFE nanofiber hydrophylized with PVA used in Example 1. The obtained bonded object was found to have the nonwoven fabric formed of hydrophilized PTFE nanofiber and the nonwoven fabric formed of unhydrophilized PTFE nanofiber, bonded therein tightly enough.

Example 3

A bonded object was prepared in the same manner as in Example 1, except that two sheets of nonwoven fabric formed of unhydrophilized PTFE nanofiber (from ZEUS Industrial Products, Inc., basis weight: 40 g/m², 30 mm square) were used, in place of two sheets of nonwoven fabric formed of PTFE nanofiber hydrophylized with PVA used in Example 1.

The obtained bonded object was found to have two sheets of nonwoven fabric formed of unhydrophilized PTFE nanofiber, bonded therein tightly enough.

Example 4

A laminate having two sheets of nonwoven fabric formed of a PTFE nanofiber hydrophilized with PVA (from ZEUS Industrial Products, Inc., basis weight: 40 g/m², cut in a size of 10×40 mm quadrilateral), and the adhesive layer A manufactured in Production Example 1 (the adhesive layer A cut into a 10×10 mm square) placed in between the two sheets of nonwoven fabric, was placed on a SUS plate. Next, a magnet was placed on the nonwoven fabric made of PTFE nanofiber, in a part where three sheets are overlapped and not in contact with the SUS plate, to temporary fix the laminate by magnetic force.

The thus temporary fixed laminate was placed, together with the SUS plate, in a pressure vessel equipped with a pressure gauge, a carbon dioxide introduction unit, and a carbon dioxide discharge unit. Gaseous carbon dioxide was slowly introduced into the pressure vessel over one minute (final pressure in the pressure vessel: 5 MPa), carbon dioxide was immediately discharged, and the SUS plate and the magnet were removed, to manufacture a bonded object.

The obtained bonded object was found to have two sheets of nonwoven fabric formed of hydrophilized PTFE nanofibers, bonded therein tightly enough.

Example 5

A laminate having two sheets of nonwoven fabric formed of a PTFE nanofiber hydrophilized with PVA (from ZEUS Industrial Products, Inc., basis weight: 40 g/m², 25 mm square), and the adhesive layer A manufactured in Production Example 1 (the adhesive layer A cut in a size of 25 mm×10 mm quadrilateral) placed in between the two sheets of nonwoven fabric, was placed on the bottom of a pressure vessel equipped with a pressure gauge, a carbon dioxide introduction unit, and a carbon dioxide discharge unit, so as to align the direction of lamination in parallel with the gravity. A weight having an outer diameter of 19.5 mm and a weight of 94.7 g was placed on the laminate, in a part thereof where three sheets of the laminate were overlapped. Gaseous carbon dioxide was then slowly introduced into the pressure vessel over one minute (final pressure in the pressure vessel: 5 MPa), carbon dioxide was immediately discharged, and the weight was removed, to manufacture a bonded object.

The obtained bonded object was found to have two sheets of nonwoven fabric formed of hydrophilized PTFE nanofibers, bonded therein tightly enough.

Example 6

The adhesive layer A manufactured in Production Example 1 (the adhesive layer A cut into a 10×10 mm square) was placed at one end of a nonwoven fabric formed of PTFE nanofiber hydrophilized with PVA (from ZEUS Industrial Products, Inc., basis weight: 40 g/m², cut in a size of 10×50 mm quadrilateral). Next, the nonwoven fabric formed of the PTFE nanofiber was rolled up so as to overlap the 10 mm-square edge thereof, opposite to the side the adhesive layer A was placed, with the adhesive layer A, and a part where three sheets were overlapped was temporary fixed by tightening a jig (precision compression spring from Samini Co., Ltd., a fixing jig having incorporated therein a spring with a free length of 10 mm, and a spring constant of 0.209 N/mm) up to a spring length of 5 mm, to form a ring-shaped laminate.

A bonded object was manufactured in the same manner as in Example 1, except that the thus formed ring-shaped laminate was placed in a pressure vessel equipped with a pressure gauge, a carbon dioxide introduction unit, and a carbon dioxide discharge unit.

The obtained bonded object was found to have a ring-shape, in which both ends of a single sheet of nonwoven fabric formed of the hydrophilized PTFE nanofiber were bonded tightly enough.

Example 7

A bonded object was prepared in the same manner as in Example 1, except that the adhesive layer B manufactured in Production Example 2 was used, in place of the adhesive layer A used in Example 1.

The obtained bonded object was found to have two sheets of nonwoven fabric formed of hydrophilized PTFE nanofibers, bonded therein tightly enough.

Example 8

A bonded object was prepared in the same manner as in Example 1, except that the adhesive layer F manufactured in Production Example 6 was used, in place of the adhesive layer A used in Example 1.

The obtained bonded object was found to have two sheets of nonwoven fabric formed of hydrophilized PTFE nanofibers, bonded therein tightly enough.

Example 9

A laminate having a nonwoven fabric formed of a PTFE nanofiber (from ZEUS Industrial Products, Inc., basis weight: 24 g/m², 300×20 mm, the base 1 in FIG. 1), and the adhesive layer A manufactured in Production Example 1 (the adhesive layer A cut in a size of 300 mm×5 mm, the adhesive 2 in FIG. 1) placed thereon, was spirally wound around a 6 mm diameter SUS pipe (cylindrical member) as shown in FIG. 2, so as to make an overlapped part 3 in FIG. 2 of 5 mm wide.

The SUS pipe having the laminate spirally wound therearound was placed in a pressure vessel equipped with a pressure gauge, a carbon dioxide introduction unit, and a carbon dioxide discharge unit. Gaseous carbon dioxide was slowly introduced into the pressure vessel over one minute (final pressure in the pressure vessel: 5 MPa), carbon dioxide was immediately discharged, and the SUS pipe was drawn off, to manufacture a bonded object.

The obtained bonded object was found to have a tubular (cylindrical) shape, in which the nonwoven fabric formed of the PTFE nanofiber was bonded tightly enough, in the bonded part (overlapped part 3 of the base/adhesive layer/base structure in FIG. 2). Note that average peel strength in Table 1 below is given by measured value of peel strength of the overlapped part 3 of the obtained bonded object, with a base material/adhesive (adhesive layer)/base structure illustrated in FIG. 2.

Comparative Example 1

An attempt was made to manufacture the bonded object in the same manner as in Example 7, except that carbon dioxide was not introduced in Example 7, only to find that two sheets of nonwoven fabric formed of the hydrophilized PTFE nanofibers separated when unclipped, and thus failed to bond two sheets of nonwoven fabric formed of the hydrophilized PTFE nanofibers. That is, a desired bonded object could not be manufactured.

Comparative Example 2

A bonded object was manufactured in the same manner as in Example 7, except that the adhesive layer D manufactured in Production Example 4 was used, in place of the adhesive layer B used in Example 7.

The obtained bonded object was found to have two sheets of nonwoven fabric formed of hydrophilized PTFE nanofibers, not bonded therein tightly enough. That is, a desired bonded object could not be manufactured.

Comparative Example 3

A bonded object was manufactured in the same manner as in Example 7, except that the adhesive layer E manufactured in Production Example 5 was used, in place of the adhesive layer B used in Example 7.

The obtained bonded object was found to have two sheets of nonwoven fabric formed of hydrophilized PTFE nanofibers, not bonded therein tightly enough. That is, a desired bonded object could not be manufactured.

<Peel Strength Test>

In order to investigate the mechanical property of the obtained bonded object, the bonded object was torn with use of a universal tensile tester (EZ-test, from Shimadzu Corporation), at a speed of 1 mm/s in the direction of stacking (under a tensile load applied vertically on the adhesion plane), and average peel strength (N/10 mm) was measured at a displacement of 5 to 10 mm (5 to 10 seconds after torn).

The bonded object with an average peel strength of 1 N/10 mm or larger was scored AA, with an average peel strength of 0.3 N/10 mm or larger and smaller than 1 N/10 mm was scored BB, and with an average peel strength of smaller than 0.3 N/10 mm was scored CC. The results are summarized in Table 1. The cases failed in bonding were denoted "No bonding" in Table 1.

TABLE 1

| | Mooney viscosity (ML 1 + 10 (121° C.)) | CO$_2$ introduction | Average peel strength (N/10 mm) |
|---|---|---|---|
| Example 1 | 96 | Yes | AA |
| Example 2 | 96 | Yes | AA |
| Example 3 | 96 | Yes | AA |
| Example 4 | 96 | Yes | AA |
| Example 5 | 96 | Yes | AA |
| Example 6 | 96 | Yes | AA |
| Example 7 | 96 | Yes | BB |
| Example 8 | 86 | Yes | AA |
| Example 9 | 96 | Yes | AA |
| Comparative Example 1 | 96 | No | No bonding |
| Comparative Example 2 | 120 | Yes | CC |
| Comparative Example 3 | 69 | Yes | CC |

Example 10

An uncrosslinked fluororubber nonwoven fabric was formed in the same manner as in Production Example 1, the uncrosslinked fluororubber nonwoven fabric was then irradiated with electron beam (EB) with use of an EB device (CB250/30/20 mA, from Iwasaki Electric Co., Ltd.), the obtained crosslinked fluororubber nonwoven fabric was peeled off from the aluminum foil, and then cut in a size of 5 mm×20 mm quadrilateral, to manufacture an adhesive layer. When irradiated, the electron beam was controlled to follow the conditions including an absorbed dose of 30, 40, 50, 60, 70, 80 or 100 kGy, at room temperature (21° C.) in a N$_2$ atmosphere.

A laminate having two sheets of nonwoven fabric formed of a PTFE nanofiber (from ZEUS Industrial Products, Inc., basis weight: 24 g/m$^2$), and the manufactured adhesive layer placed in between the two sheets of nonwoven fabric, was lightly pressed by hands, at a part where the three sheets of the laminate are arranged as overlapped.

The thus pressed laminate was placed in a pressure vessel equipped with a pressure gauge, a carbon dioxide introduction unit, and a carbon dioxide discharge unit, gaseous carbon dioxide was slowly introduced into the pressure vessel over one minute (final pressure in the pressure vessel: 6 MPa), carbon dioxide was immediately discharged, to manufacture a bonded object.

With use of the thus manufactured bonded object, the average peel strength was measured in the same manner as described previously. The results are summarized in Table 2.

TABLE 2

| Absorbed dose (kGy) | Average peel strength (N/10 mm) |
|---|---|
| 30 | AA |
| 40 | AA |
| 50 | AA |
| 60 | AA |
| 70 | AA |
| 80 | BB |
| 100 | BB |

Example 11

Two sheets of nonwoven fabric formed of PTFE nanofibers having an average fiber diameter of 900 nm (from ZEUS Industrial Products, Inc., basis weight: 24 g/m$^2$) were individually punched into a 19-mm-diameter circle, to prepare bases.

Also the crosslinked fluororubber nonwoven fabric manufactured in Production Example 2 was punched into a 19-mm-diameter circle, to prepare an adhesive.

A laminate, having the thus obtained base, the thus obtained adhesive, and the thus obtained base stacked therein in this order, was placed in a sealable vessel (disclosed in JP 2018-099885 A, caliber: 20 mm) equipped with a piston, a carbon dioxide introduction unit, and a carbon dioxide discharge unit, into which carbon dioxide equivalent to a vapor pressure thereof (cylinder pressure: 6 MPa) was introduced at room temperature (25° C.), the piston was then brought down to reduce the inner volume of the vessel (while liquefying carbon dioxide), and pressure of a 500 N load was applied for 10 seconds to pressure-bond two bases with the adhesive (crosslinked fluororubber nonwoven fabric). Carbon dioxide was then instantaneously discharged while maintaining the pressure, the pressure was then released, and the obtained 20-mm-diameter bonded object (press-bonded object) was taken out from the vessel.

Note that, in the process of lamination, a polyimide film that serves as a tab at a peel-off point in the peel strength test was partially inserted between the base and the adhesive (so as to protrude outward).

With use of the thus manufactured bonded object (press-bonded object), the average peel strength was measured in the same manner as described previously. Results are summarized in Table 3.

Example 12

A bonded object (press-bonded object) was prepared in the same manner as in Example 11, except that the crosslinked fluororubber nonwoven fabric manufactured in Production Example 3 was used, in place of the crosslinked fluororubber nonwoven fabric manufactured in Production Example 2 and used in Example 11. With use of the thus obtained bonded object (press-bonded object), the average peel strength was measured in the same manner as described previously. Results are summarized in Table 3.

Comparative Example 4

A bonded object (press-bonded object) was manufactured in the same manner as in Example 11, except that carbon dioxide used in Example 11 was not introduced.

The obtained bonded object (press-bonded object) was found to have the bases and the adhesive (crosslinked fluororubber nonwoven fabric) not bonded therein. That is, a desired bonded object (press-bonded object) could not be manufactured.

Comparative Example 5

A bonded object (press-bonded object) was manufactured in the same manner as in Example 11, except that the crosslinked fluororubber nonwoven fabric manufactured in Production Example 4 was used, in place of the crosslinked fluororubber nonwoven fabric manufactured in Production Example 2 and used in Example 11.

The obtained bonded object (press-bonded object) was found to have the bases and the adhesive (crosslinked fluororubber nonwoven fabric) only poorly bonded therein (average peel strength: smaller than 0.3 N/10 mm), resulted in separation between the bases and the adhesive. That is, a desired bonded object (press-bonded object) could not be manufactured.

Comparative Example 6

A bonded object (press-bonded object) was prepared in the same manner as in Example 11, except that the cross-linked fluororubber nonwoven fabric manufactured in Production Example 5 was used, in place of the crosslinked fluororubber nonwoven fabric manufactured in Production Example 2 and used in Example 11.

The obtained bonded object (press-bonded object) was found to have the bases and the adhesive (crosslinked fluororubber nonwoven fabric) only poorly bonded therein (average peel strength: smaller than 0.3 N/10 mm), resulted in separation between the bases and the adhesive. That is, a desired bonded object (press-bonded object) could not be manufactured.

TABLE 3

| | Mooney viscosity (ML 1 + 10 (121° C.)) | $CO_2$ introduction | Average peel strength (N/10 mm) |
|---|---|---|---|
| Example 11 | 96 | Yes | 1.8 |
| Example 12 | 109 | Yes | 1.35 |
| Comparative Example 4 | 96 | No | No bonding |
| Comparative Example 5 | 120 | Yes | <0.3 |
| Comparative Example 6 | 69 | Yes | <0.3 |

REFERENCE SIGNS LIST

1 Base
2 Adhesive
3 Overlapped part of base/adhesive (adhesive layer)/base
4 Rod or cylindrical member

The invention claimed is:

1. A method for manufacturing a bonded object, the method comprising:
preparing a structure having bases and an adhesive arranged between the bases; and
joining the structure in the presence of liquid or gaseous carbon dioxide,
the adhesive being obtained from a fluororubber composition having a Mooney viscosity ML 1+10 at 121° C., measured in accordance with ASTM D1646, of 80 to 115.

2. The method for manufacturing the bonded object according to claim 1, further comprising:
placing the structure in a pressure vessel; and
introducing carbon dioxide into the pressure vessel.

3. The method for manufacturing the bonded object according to claim 2,
wherein the step of introducing carbon dioxide into the pressure vessel is
introducing liquid or gaseous carbon dioxide so as to adjust a pressure in the pressure vessel at 3 MPa or higher.

4. The method for manufacturing the bonded object according to claim 1, wherein the fluororubber composition comprises at least one fluororubber selected from fluoroelastomer and perfluoroelastomer.

5. The method for manufacturing the bonded object according to claim 1,
wherein the fluororubber composition comprises:
a fluororubber (A1) having a Mooney viscosity ML 1+10 at 121° C., measured in accordance with ASTM D1646, of 40 to 150; and
a fluororubber (A2) having a Mooney viscosity ML 1+10 at 121° C., measured in accordance with ASTM D1646, of 10 or larger and smaller than 40.

6. The method for manufacturing the bonded object according to claim 1, wherein the fluororubber composition comprises a vinylidene fluoride-hexafluoropropylene-tetrafluoroethylene-based polymer.

7. The method for manufacturing the bonded object according to claim 1, wherein the adhesive is the fluororubber composition in a liquid or paste form; a dried product of the fluororubber composition in a liquid or paste form; or a fiber, nonwoven fabric, or film obtained from the fluororubber composition.

8. The method for manufacturing the bonded object according to claim 1,
wherein the adhesive is
a fluororubber fiber or fluororubber nonwoven fabric obtained by a method comprising:
spinning the fluororubber composition; and
crosslinking a fiber obtained in the step A.

9. The method for manufacturing the bonded object according to claim 1, wherein at least one of the bases is a nonwoven fabric, a woven fabric, a porous membrane, or a fiber.

10. The method for manufacturing the bonded object according to claim 1,
wherein the base is a base selected from a nonwoven fabric, a woven fabric, and a porous membrane, and
the adhesive is a fiber or nonwoven fabric obtained from the fluororubber composition.

* * * * *